No. 615,199. Patented Nov. 29, 1898.
F. H. RICHARDS.
WEIGHING MACHINE.
(Application filed Nov. 29, 1897.)
(No Model.) 5 Sheets—Sheet 1.
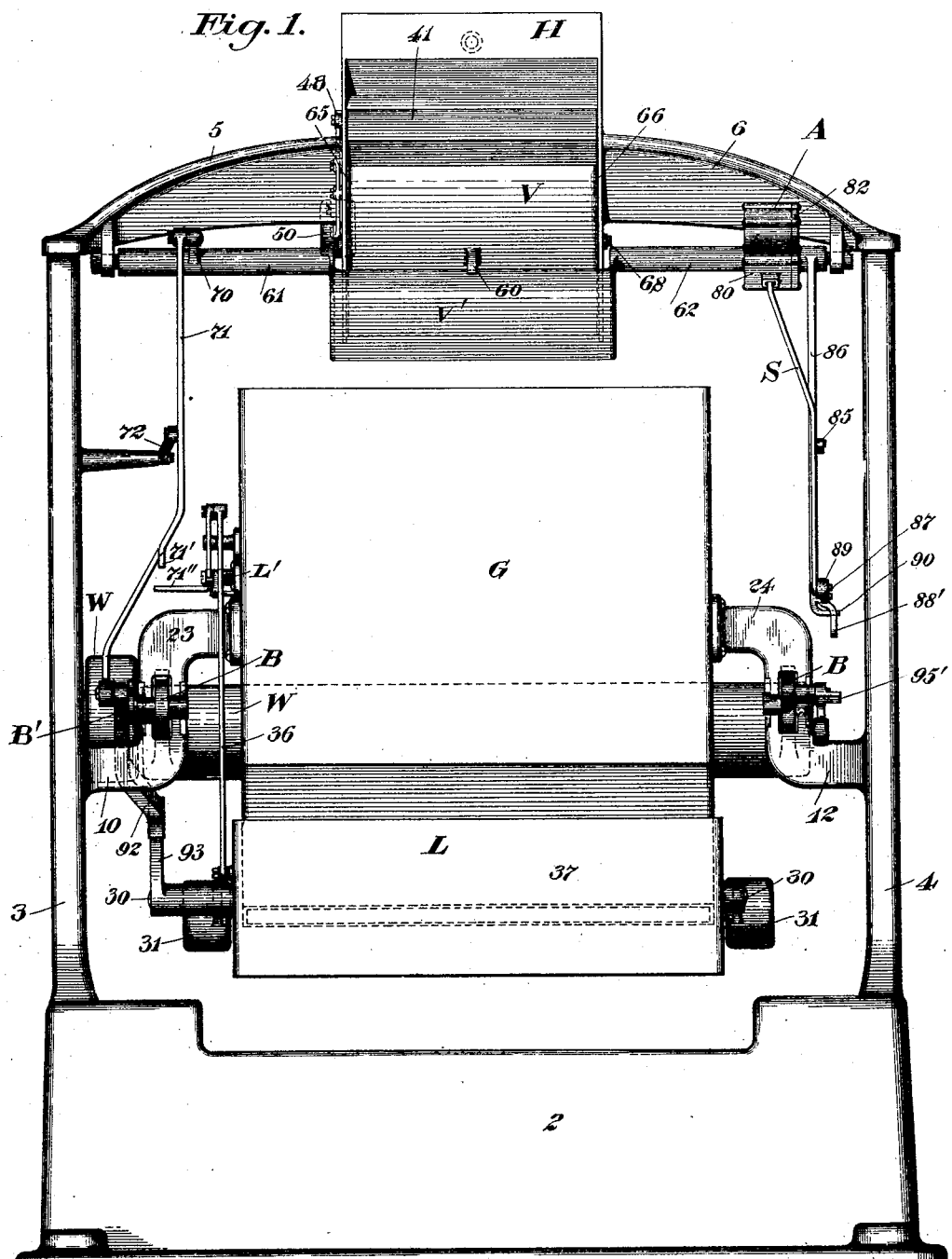

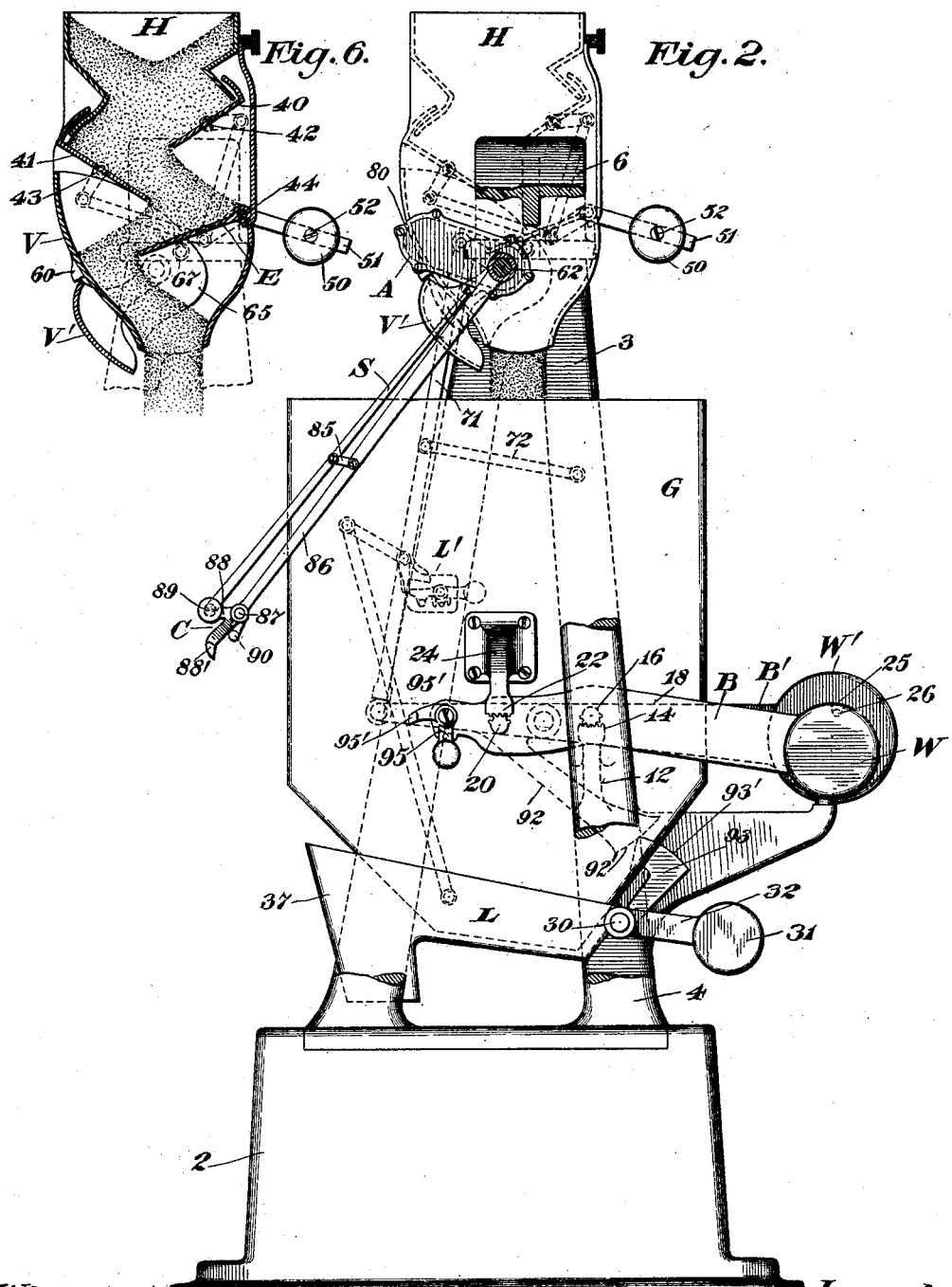

No. 615,199. Patented Nov. 29, 1898.
F. H. RICHARDS.
WEIGHING MACHINE.
(Application filed Nov. 29, 1897.)
(No Model.) 5 Sheets—Sheet 3.
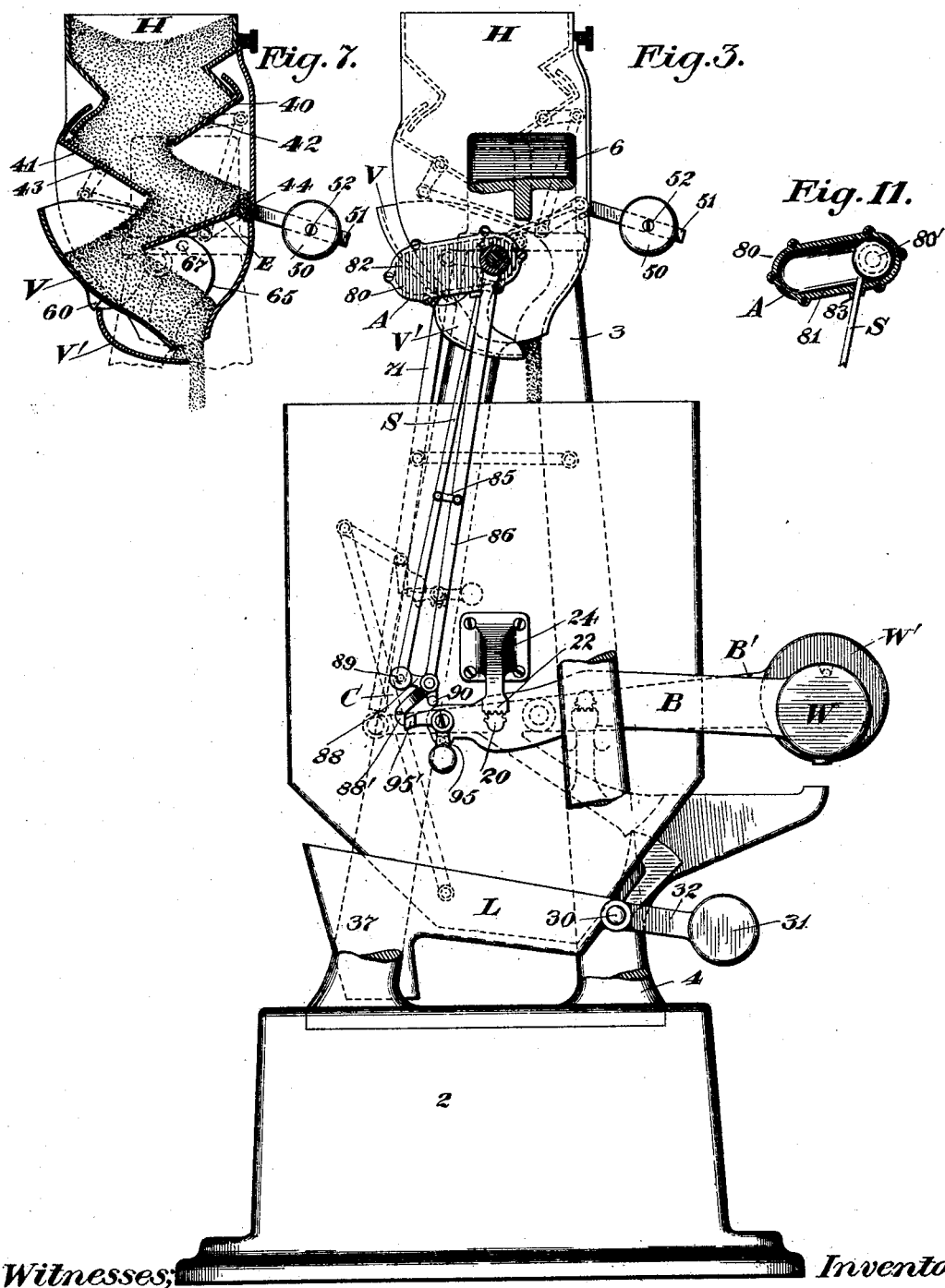
Witnesses:
C. W. Smith
Fred. J. Dole.
Inventor:
F. H. Richards No. 615,199. Patented Nov. 29, 1898.
F. H. RICHARDS.
WEIGHING MACHINE.
(Application filed Nov. 29, 1897.)
(No Model.) 5 Sheets—Sheet 4.
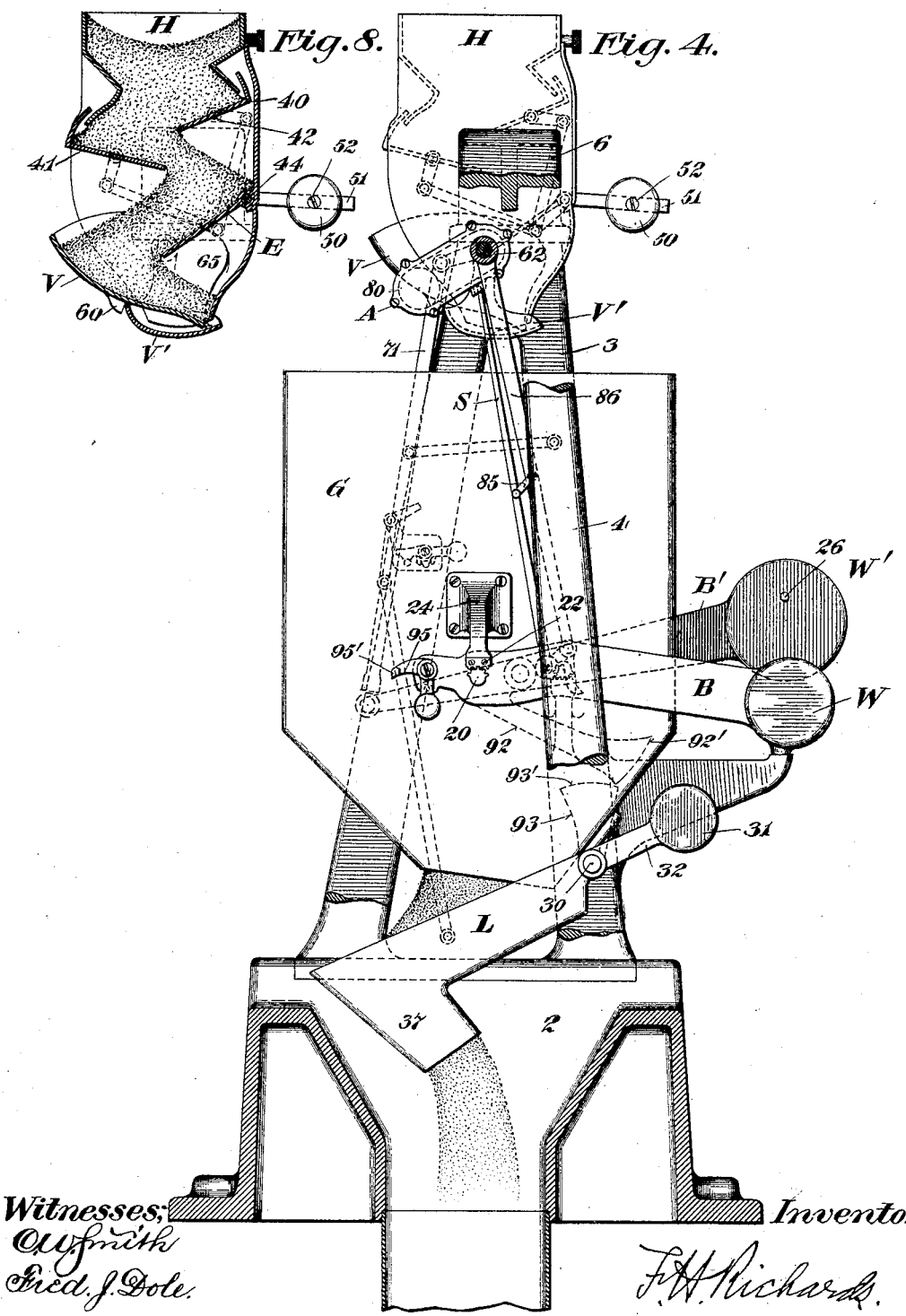

No. 615,199. Patented Nov. 29, 1898.
F. H. RICHARDS.
WEIGHING MACHINE.
(Application filed Nov. 29, 1897.)
(No Model.) 5 Sheets—Sheet 5.
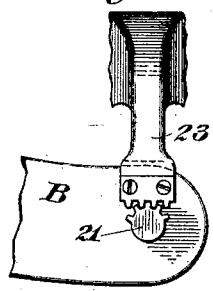
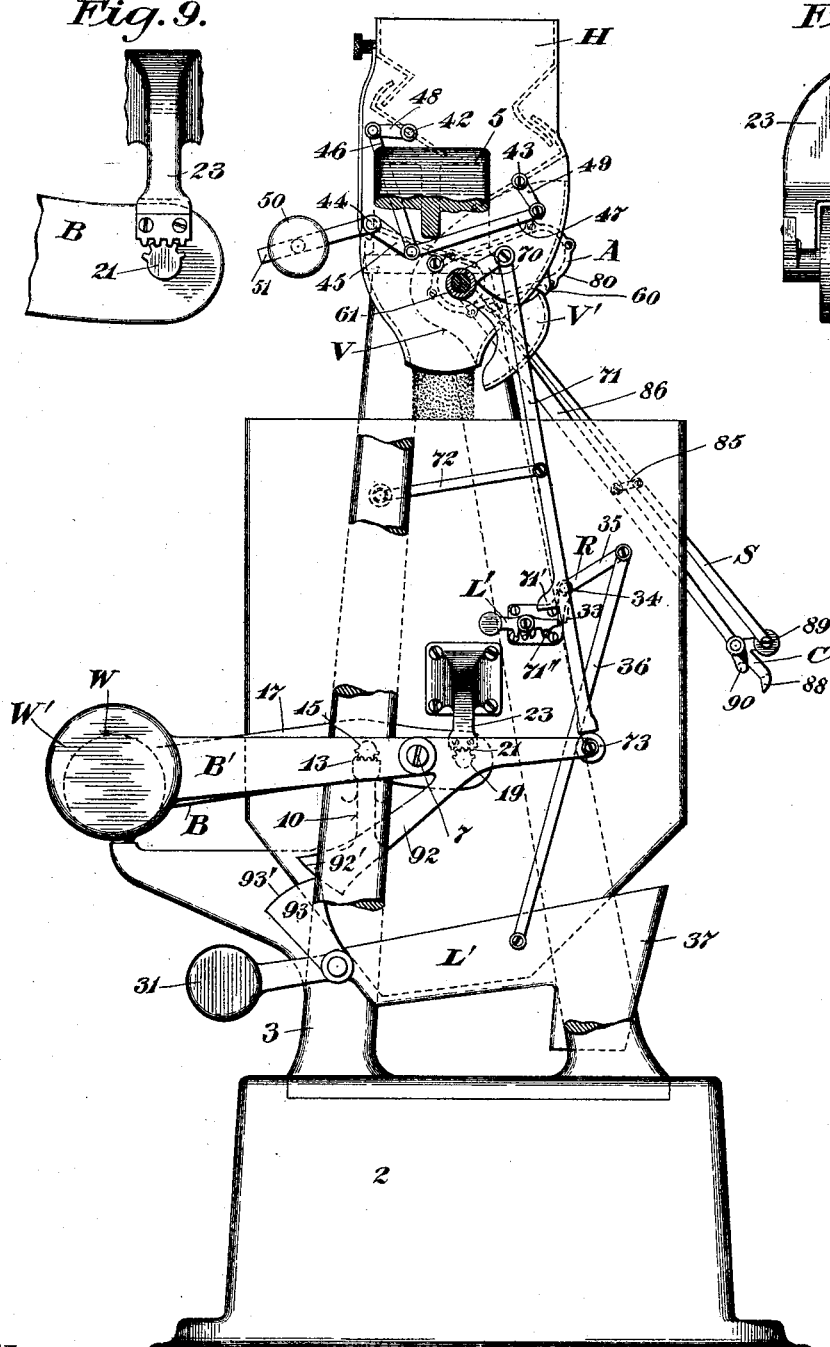
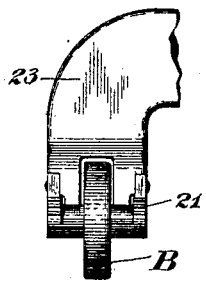
Witnesses:
O. W. Smith
Fred. J. Dole.
Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 615,199, dated November 29, 1898.

Application filed November 29, 1897. Serial No. 660,118. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering various kinds of material.

The invention includes as one of its features an actuator, which may serve to operate a valve or other part, involving a traveling weight, which is adapted to move on the respective working strokes of the actuator, in combination with means independent of said actuator for intercepting the movement of the weight. This actuator is adapted, preferably, to operate the valve or other stream-controlling member, and the traveling weight is prevented from acting for a predetermined length of time, by reason of which construction its effect cannot be applied to the weighing mechanism. The actuator is preferably reciprocatory about a horizontal axis, and when it moves to a position below a horizontal line the weight will tend to move; but this is prevented for a predetermined time by a stop, in the present case. On the retraction of the stop the weight is free to move and when it reaches the limit of its travel can transmit to the valve a powerful leverage for quickly shutting the same.

Another feature of the invention resides, in combination with a hopper, in a series of oppositely-oscillatory plates, the axes of which are at opposite sides of said hopper; a regulator supported in the hopper for oscillation and movable downward by the material passing through said hopper on the increase in specific gravity of such material; means acting against the regulator in opposition to the material, and connections between the regulator and the plates for governing the supply and valve mechanism. By reason of this construction the supply of material can be automatically regulated. In connection with the supply means, constructed as above set forth or without the interior plates, a pair of valves is provided, said valves being movable about different axes and one of them being controlled by the other and both moving in the same direction, and means are preferably provided for imparting an accelerated closing movement to the auxiliary valve independent of the main valve, so as to effect a quick stoppage of the supply.

In the drawings accompanying and forming a part of this specification, Figure 1 is a front elevation of my improved weighing-machine. Figs. 2, 3, and 4 are side elevations of the machine as seen from the right in Fig. 1, showing the positions occupied by the different parts during the making and discharging of a load. Fig. 5 is a side elevation as seen from the left in Fig. 1, the parts being in positions corresponding with said Figs. 1 and 2. Figs. 6, 7, and 8 are longitudinal central sections of the stream-supply means. Figs. 9 and 10 are details in elevation hereinafter more particularly described, and Fig. 11 is a detail hereinafter more particularly described.

Similar characters designate like parts in all the figures of the drawings.

The framework for supporting the different parts of the machine consists in the present case of the chambered base or bed 2, side frames 3 and 4, rising therefrom, and the brackets 5 and 6, extending oppositely from the hopper H, serving as a convenient means for delivering a stream of material to the load-receiver of the weighing mechanism.

The weighing mechanism consists of a load-receiver, as G, and a plurality of scale-beams, as B and B', therefor, the beams having counterweights W and W' counterpoising the loaded load-receiver G, and the auxiliary beam B' is shiftably mounted upon its companion, as is illustrated in Letters Patent No. 548,840, granted to me October 29, 1895, the connection between the two beams being a pivotal one, as at 7. The weighing mechanism, as is apparent, involves a load-receiver and a scale-beam mounted on the framework and supporting the load-receiver, and one or both of said parts may be carried on its support through intermediate meshing gearing. The beam and the load-receiver are each shown as thus mounted.

The side frames 3 and 4 are provided with the posts or uprights 10 and 12, having gear-teeth or racks 13 and 14, respectively adapted to mesh with the curved segments 15 and 16, fixed to the beam-arms 17 and 18, respectively, said beam-arms having at their poising ends the segment-gears 19 and 20, adapted to sustain the meshing racks or segment-gears 21 and 22, secured to the lower end of the brackets 23 and 24, respectively, upon opposite sides of the load-receiver.

The foregoing construction is particularly advantageous for use in connection with large-sized machines, where the tendency to dismount the load-receiver or beam when upon a knife-edge or V-shaped bearing is somewhat marked.

The beam-weight W has at one end a recess 25, adapted to receive the pin 26 on the adjacent weight W', so that on the descent of the weighing mechanism the two beams serve practically as one, for a purpose that will hereinafter appear.

The discharge of the loads from the load-receiver G is controlled by a closer, as L, pivoted to the load-receiver, as at 30, and closed by the counterweight 31 upon the rearwardly-extending arm 32 on said closer.

The means for holding the closer shut includes a latch L', pivoted upon the load-receiver and adapted to engage the arm 33 on the rocker R, pivoted, as at 34, to the load-receiver, the arm 35 of said rocker being jointed to the longitudinal link 36, which is pivoted at its lower end to the closer. (See Fig. 5.) When the latch L' is disengaged from the rocker-arm 33, the closer L will be released and can be forced open by the weight of the material in the load-receiver to discharge the load, the discharging material entering the conduit or tube 37 on the front edge of the load-receiver and being confined temporarily therein, so as to weight the discharge edge of the closer and retard the shutting thereof by the counterweight 31. When the material passes from the closer, the latter is shut by the counterweight 31 in a familiar manner and held shut by the latch L'.

The hopper H incloses a series of stream-reducing plates, as 40 and 41, the first mentioned being located above the other, and said plates being oppositely oscillatory and being operated from a regulator of suitable construction to control the amount of material supplied to the load-receiver G. The plates 40 and 41 are pivoted, as at 42 and 43, respectively, in the hopper between their discharge and rear edges, and they are oppositely inclined, by reason of which they tend to break the force of the supply-stream from a point above the hopper H, the plate 40 serving to direct the flowing material onto its companion 41, which delivers it toward the stream-regulator E, pivoted, as at 44, for oscillatory movement in the hopper.

The pivot 44 of the oscillatory supply-regulator E consists of a transverse rock-shaft carried in the walls of the hopper, a projecting end of said shaft being furnished with the crank-arm 45, to which the links 46 and 47, respectively, are pivoted, said links being likewise jointed at their opposite extremities to the crank-arms 48 and 49 on the plate-pivots 42 and 43, respectively.

On an increase in the specific gravity or weight of the material passing through the supply-hopper, which may be caused by dampness of the material, the plate E will be lowered thereby, and by reason of the connections hereinbefore described the discharge edges of the stream-reducing plates 40 and 41 will be moved toward each other to decrease the supply. On the decrease in weight of the material a device independent of the plate and acting in opposition to the material will be brought to bear on said plate to elevate the same, and consequently to increase the supply to permit a larger quantity of material to enter the load-receiver. The means thus shown for operating the plate in opposition to the stream or body of material consists of the weight 50 on the arm 51, fixed to the rock-shaft 44, the weight being held in an adjusted position by a set-screw 52, engaging said arm.

The means for regulating the quantity of material to be supplied to the weighing mechanism consists in the present case of a plurality of valves, as V and V', movable about different axes, the main valve V cutting off the larger part of the supply and the auxiliary valve being given an accelerated movement relatively to the main valve to instantly stop the flow of material to the load-receiver.

The closure of the auxiliary valve V' is controlled from the weighing mechanism, and the corresponding movement of the main valve V is controlled by the auxiliary valve, the main valve having a projection 60, adapted to engage the adjacent portion of the auxiliary valve, so that as the latter is closed the main valve cannot be operated too quickly. The auxiliary valve V' is provided with the oppositely-extending shaft portions 61 and 62, having bearing-sockets at their opposite ends adapted to receive the usual pivot-screws on the brackets 5 and 6, respectively.

The main and the auxiliary valves are adapted to close for a portion of their travel by gravity, the auxiliary valve receiving an accelerated thrust relatively to the main valve by an actuator, as A, hereinafter more particularly described, and fixed to the valve projection 62 of said auxiliary valve.

The wing-pieces 65 and 66 of the main valve are pivoted, as at 67 and 68, respectively, to the opposite side walls of the hopper, and said valve has a preponderance of weight below its center, so that it is self-closing.

The lateral projection 61 of the auxiliary valve has a crank-arm 70, to which the rod 71 is pivoted, said rod being connected with the frame by the guide-link 72 and its free end bearing against the antifriction-roll 73 at the poising or inner end of the auxiliary beam B', and as the two beams descend the two valves may be closed by their own weight.

The actuator A illustrated consists of a carrier and a rolling weight, the carrier being fixed in the present case to the projection 62 of the valve. This, however, is not of my invention, but of another. My improvement consists of an actuator involving a traveling weight and means independent of the actuator for intercepting the movement of the weight, and by virtue of this organization the effect of the actuator-weight applied to the weighing mechanism is removed during the greater period of operation of the machine. On the release of the weight, however, it can roll to its opposite extreme position, and thereby becomes effective for transmitting to the valve a powerful leverage to quickly close the same.

The carrier for the actuator-weight is designated by 80, and it consists of a casing or box, along the floor 81 of which the weight is adapted to roll, said weight being held in place by the removable cap or carrier 82. The carrier or weight-case 80 is fixed near one end to the valve projection 62, so that when the floor of the carrier is inclined above the horizontal, as represented in Fig. 2, the weight can lie against the inner end of the same, in which position it is preferably held by a stop, as S, independent of the actuator, said stop being projectable across the path of the weight to hold the latter in such ineffective position, with its center of gravity coincident with the axis of the valve. The stop S is retracted by a suitable actuator to release the weight 80', this operation occurring when the floor 81 of the carrier passes below the horizontal, at which time the weight can descend to the opposite extreme end of the carrier to accomplish the hereinbefore-described result. The stop S consists in the present case of a reciprocatory bar, the upper end of which is adapted to be thrust through the opening 83 in the floor 81 of the carrier. (See Fig. 1.) The stop S is preferably connected intermediate of its ends by the guide-link 85 with the controlling-rod 86, fixed to and depending from the valve projection 62, it being apparent that the rod 86 is operative with the valve.

The controlling-rod 86 carries at its lower end an actuator, as C, for the weight-intercepting stop S, the actuator being preferably connected with the stop to operate the latter. The actuator C consists, preferably, of an angle-lever pivoted, as at 87, to the lower end of a rod 86, the weighted arm 88 of said actuator being pivoted, as at 89, to the lower end of the stop S, the non-counterweighted arm of the actuator or lever being held against the stop 90 at the lower end of the rod 86. As the valve V is shut by its own weight in the manner hereinbefore specified, the rod 86 and actuator-carrier 80 will swing therewith until the stop-actuator C strikes against an abutment of suitable construction, preferably controlled by the weighing mechanism, and by reason of the connection between the actuator and the stop and rod when this action takes place the stop S on the continued movement of the valve will be thrust upward, thereby moving the working end thereof across the path of the rolling weight 80', and about this time the floor 81 of the actuator-carrier 80 will have crossed a horizontal line. On the completion or substantial completion of the load in the load-receiver G the actuator C will be released, and its weighted arm 88 can drop, so as to lower the stop S and carry the upper end of the latter below the plane of the carrier-floor 81, so as to release the weight 80' and permit the same to fall against the opposite end of the carrier, whereby the working end of the actuator A can fall, and, being operative with the valve V', the latter will be quickly shut relatively to the coöperating main valve V, said main valve subsequently closing until the projection 60 abuts against the auxiliary valve. When the floor 81 of the actuator-casing 80 reaches the horizontal, the actuator C or the projection 88' thereof will strike the coöperating projection 95' on the abutment 95, consisting of a by-pass device of ordinary construction pivoted at the inner end of the beam-arm 18, so as to swing the actuator C about its center and lift the stop S, so as to force the latter across the path of the weight 80'. On the completion of the load the abutment 95 is carried out of contact with the actuator C, so that the weighted arm 88 thereof can drop to draw the stop S downward and release the weight 80'. On the discharge of the completed load the auxiliary beam B' is held against return movement with the main beam by interlocking stop mechanism, and on the release of said auxiliary beam it imparts an upward thrust to the rod 71 for opening the auxiliary valve V', it being evident, of course, by reason of the construction hereinbefore described, that the main valve V is similarly opened.

I provide in connection with one of the beams, preferably the auxiliary beam B', and the closer L a pair of coacting stops, consisting, preferably, of segmental blades 92 and 93, respectively fixed to the beam B' and to the closer L at points adjacent to their axes, the two blades having curved working faces 92' and 93' concentric with the axes of the respective members, and each of said blades serves to limit the operation of the other, and consequently of the parts with which they are respectively connected. The stop or blade 92 serves to prevent the premature opening movement of the closer L in case the latch L' should be tripped too quickly, and the stop 93 blocks the return movement of the auxiliary beam B', with its companion B, and hence also prevents the premature opening of the valve V', it being understood that said valve is operated from the auxiliary beam. The operation of these coöperating stops is apparent from an inspection of Figs. 2 to 5 of the drawings. In Fig. 2 the stop 92 is in contact with the coöperating curved face 92' of the beam-operative stop 92, so that should the latch L' be tripped accidentally or too soon the stop 92 will bar the operation or movement of the coöperating stop 93, and hence will hold the closer shut. When the beam mechanism reaches the end of its descending movement, the stop 92 will be carried above the path of the stop 93, so that the closer L can open to discharge a load. As the closer opens the curved face of the stop 93 will be swung under the stop 92 and in contact therewith, and it will be evident that while the beam B is free to return to its primary position such operation of the auxiliary beam B' is prevented by the stop 93, which blocks the operation of its companion until the closer has reached its shut position, (indicated in Fig. 2,) at which time the auxiliary beam returns to its initial position and furnishes the power for opening the auxiliary valve V'.

The reciprocatory rod 71 is furnished with the usual latch-tripper 71', adapted to strike the pin 71" on the latch L' to release the closer L in the well-known manner.

The operation of the hereinbefore-described machine is as follows: In Fig. 2 the parts are illustrated in their primary positions, the closer L being shown shut and held in position by the latch L' engaging the arm 33 of the rocker R and the valves V and V' being wide open, so that the full volume of the supply can enter the empty load-receiver, and when a certain portion of the load has been received the beam mechanism will descend and the inner end of the auxiliary beam B' will fall away from the rod 71, so as to permit the two valves V and V' to shut by gravity to effect a reduction of the supply, the supply being subsequently cut off by the auxiliary valve V'. When the load is almost completed, the lever C will strike the abutment 95 on the poising end of the beam-arm 18, so as to thrust the stop S upward and across the path of the actuator-weight 80', the floor 81 of the actuator-casing 80 having at this point reached a point slightly below a horizontal line and the stop S serving to prevent the movement of the weight. On the completion of the load the abutment 95 on the beam will pass below the lever C, thereby releasing the latter, so that the weighted arm 88 can drop to pull the stop S downward, thereby freeing the weight 80', so that the latter can roll to the end of the casing 80, thereby to impart a sudden movement to the valve V' for swinging the latter under the outlet of the hopper H to stop the supply. When the load is completed, the tripper 71' will strike the latch-pin 71", thereby releasing the closer L, so that the closer can be forced open by the weight of the load and the latter discharged in the usual manner. On the discharge of the load the closer L will be shut by the counterweight 31, after which the several parts will return to their primary positions to repeat the operation.

Having described my invention, I claim—

1. An actuator including a traveling weight, in combination with means operable independently of the actuator for successively stopping and releasing the weight.

2. The combination, with weighing mechanism, of a supply-controlling apparatus including a traveling weight; a weight-stop; and means controlled by the weighing mechanism for actuating said weight-stop at one portion of the weighing operation to intercept said weight, and at another portion of the weighing operation to release said weight.

3. The combination, with a valve, of an actuator operative with the valve and movable about the same axis as said valve, and involving a weight adapted to travel upon the carrier on the operation thereof, and means independent of the actuator for intercepting the movement of the weight.

4. An actuator for valves, &c., involving a traveling weight, in combination with means independent of the actuator for intercepting the movement of the weight and for subsequently releasing said weight.

5. An actuator for valves, &c., involving a traveling weight, in combination with a stop projectable across the path of the traveling weight, and means for operating said stop to block the operation of the weight.

6. An actuator for valves, &c., involving a traveling weight and a carrier for the same, in combination with a reciprocatory stop projectable across the path of the traveling weight; and means for successively actuating the stop first to block and then to release said weight.

7. The combination, with a valve, of a casing operative with the valve and having an opening; a weight adapted to travel along the floor of said casing; a stop projectable through said opening to control the action of the weight; and means for operating said stop.

8. The combination, with a valve having a projection, of a casing fixed to said projection, said casing being movable about the same axis as the valve and having an opening; a weight adapted to travel along the floor of said casing; a stop projectable through said opening to control the action of the weight; and means for operating said stop.

9. The combination, with weighing mechanism, of a valve; a valve-actuator involving a traveling weight; a stop in position to intercept the movement of the weight; and means operative with the weighing mechanism for controlling the action of the stop.

10. The combination, with weighing mechanism, of a valve; a valve-actuator involving a traveling weight; means operative with the weighing mechanism for holding the traveling weight against action and then releasing the same.

11. The combination, with weighing mechanism, of a valve; a valve-actuator involving a traveling weight; a stop in position to intercept the movement of the weight; an actuator for said stop; a carrier operative with the valve for the actuator; and an abutment controlled by the weighing mechanism in position to be engaged by said last-mentioned actuator at a predetermined point.

12. The combination, with weighing mechanism, of a valve; a valve-actuator involving a traveling weight; a stop projectable across the path of the weight; a carrier operative with the valve; an actuator for said stop, mounted on the carrier; and an abutment mounted on the weighing mechanism and adapted to be engaged by said last-mentioned actuator at a predetermined point.

13. The combination, with a load-receiver and a supporting scale-beam therefor, of a valve; a valve-actuator involving a traveling weight; a stop projectable across the path of the weight; an actuator for said stop; a carrier operative with the valve for the actuator; and an abutment on the scale-beam, adapted to be engaged by said last-mentioned actuator at a predetermined point.

14. The combination, with weighing mechanism, of a valve; a valve-actuator involving a traveling weight; a rod operative with the valve and with the actuator; a stop projectable across the path of the traveling weight; and an actuator for said stop, jointed to said rod.

15. The combination, with weighing mechanism, of a valve; a valve-actuator involving a traveling weight; a rod operative with the valve and with the actuator; a stop projectable across the path of the traveling weight; and an actuator for said stop, pivoted, respectively thereto and to said rod.

16. The combination, with weighing mechanism, of a valve; a valve-actuator involving a traveling weight; a stop projectable across the path of the weight; a counterweighted actuator for operating the stop to effect the release of the weight; and means for controlling the operation of said last-mentioned actuator, said means being operative with the weighing mechanism.

17. The combination, with weighing mechanism, of a valve having a projection; a casing fixed to the projection and inclosing a traveling weight, said casing and the valve being movable about the same axis; a rod fixed to, and depending from, said projection and carrying an actuator; and a stop projectable across the path of the traveling weight and connected with the last-mentioned actuator for operation.

18. The combination, with a hopper, of a series of stream-reducing plates located therein and oppositely oscillatory about fixed axes at opposite sides of the hopper; a regulator disposed in the hopper for oscillation, and movable downward by the material passing through said hopper on the increase in specific gravity of such material; means acting against the regulator in opposition to the material; a connection between the regulator and the plates for governing the supply; and valve mechanism for the hopper.

19. The combination, with a hopper, of a series of superposed stream-reducing plates located therein and oppositely oscillatory about fixed axes at opposite sides of the hopper, and oppositely inclined; a regulator disposed in the hopper for oscillation and movable downward by the material passing through said hopper, on the increase in specific gravity of such material; means acting against the regulator and in opposition to the material; a connection between the regulator and plates for governing the supply; and mechanism for the hopper.

20. The combination, with a hopper, of a series of plates located therein and oppositely oscillatory about fixed axes at opposite sides of the hopper; a regulator disposed in the hopper for oscillation, and movable downward by the material passing through said hopper, on the increase in specific gravity of such material; a counterweight connected with the regulator and acting in opposition to the material; connections between the regulator and the plates for operating the latter; and valve mechanism for the hopper.

21. The combination, with a hopper, of a series of plates located therein and oppositely oscillatory about fixed axes at opposite sides of the hopper, and located one above the other; crank-arms secured to the pivots of the plates; an oscillatory plate shiftable downward by the material passing through said hopper on the increase in specific gravity of such material; a shaft provided with a weighted arm and with a crank-arm; a pair of links pivoted to the last-mentioned crank-arm and the first-mentioned crank-arms, respectively; and valve mechanism for the hopper.

22. The combination, with weighing mechanism, of a supply apparatus including a stream-controller provided with a weight-carrier adapted to have a working stroke of two successive portions; a traveling weight supported by said weight-carrier and having thereon a stroke from a relatively ineffective position to an effective position; a weight-stop operative independently of the weighing mechanism; and means controlled by the weighing mechanism for rendering said stop effective, during one portion of the working stroke of the weight-carrier, for holding the weight in its ineffective position.

23. The combination, with weighing mechanism, of a supply apparatus including a stream-controller having two stages of operation; a weight-carrier; a traveling weight carried by said weight-carrier; a stop effective to hold the weight against movement during one portion of the operation of the stream-controller; and means for automatically releasing said weight during the other portion of the operation of said stream-controller.

24. The combination, with stream-supplying means, of main and auxiliary valves, the auxiliary valve being operated by the main valve; a carrier connected with one of the valves; a traveling weight supported by said carrier; and means operable independently of the carrier for successively stopping and releasing said weight.

25. The combination, with a load-receiver, of a scale-beam having projections at different points in its length, each of which is provided with gear-teeth; a post on the framework, having gear-teeth adapted to mesh with the teeth on one of said projections; and a projection on the load-receiver, having gear-teeth adapted to mesh with the gear-teeth on the other projection.

26. The combination, with a load-receiver having a closer, of a scale-beam for said load-receiver, and a pair of blades adapted to run in contact with each other and fixed, respectively, to the scale-beam and to the closer, each of said blades having a curved working face concentric with the axis of movement thereof.

27. The combination, with a load-receiver, of main and auxiliary beams therefor, the auxiliary beam being shiftably carried by the main beam; a valve; connections between the valve and the auxiliary beam; a closer for the load-receiver; and reciprocally-effective stops secured, respectively, to the closer and auxiliary scale-beam.

FRANCIS H. RICHARDS.

Witnesses:
F. N. CHASE,
JOHN O. SEIFERT.